US008739959B2

(12) United States Patent
Breil

(10) Patent No.: US 8,739,959 B2
(45) Date of Patent: Jun. 3, 2014

(54) ARRANGEMENT FOR MACHINING WORKPIECES

(75) Inventor: Anton Breil, Salach (DE)

(73) Assignee: Mall + Herlan GmbH, Pfinztal (DE)

( * ) Notice: Subject to any disclaimer, the term of this patent is extended or adjusted under 35 U.S.C. 154(b) by 308 days.

(21) Appl. No.: 13/136,709

(22) Filed: Aug. 8, 2011

(65) Prior Publication Data

US 2012/0031730 A1 Feb. 9, 2012

(30) Foreign Application Priority Data

Aug. 7, 2010 (DE) ........................ 10 2010 033 749

(51) Int. Cl.

*B65G 35/00* (2006.01)
*B65G 47/74* (2006.01)
*B65G 37/00* (2006.01)
*B65G 47/84* (2006.01)
*B65G 29/00* (2006.01)

(52) U.S. Cl.

USPC ..................... 198/348; 198/478.1; 198/470.1; 198/803.7

(58) Field of Classification Search

None
See application file for complete search history.

(56) References Cited

U.S. PATENT DOCUMENTS

| | | | | |
|---|---|---|---|---|
| 7,543,697 | B2 * | 6/2009 | Legallais | 198/478.1 |
| 7,665,197 | B2 * | 2/2010 | Smolarek | 29/33 P |
| 8,439,181 | B2 * | 5/2013 | Hausladen | 198/478.1 |

FOREIGN PATENT DOCUMENTS

| | | |
|---|---|---|
| DE | 39 08 394 | 12/1989 |
| DE | 198 10 238 | 5/1999 |
| DE | 103 25 693 | 7/2004 |
| DE | 10 2009 010 280 | 10/2009 |
| EP | 1 060 831 | 12/2000 |
| GB | 2 004 805 | 4/1979 |
| WO | 2009/104250 A1 | 8/2009 |

* cited by examiner

*Primary Examiner* — Kavel Singh
(74) *Attorney, Agent, or Firm* — Klaus & Bach

(57) ABSTRACT

In an arrangement for machining workpieces, with at least a first machining station in which the workpieces are machined during an operating cycle comprising a machining phase and a transport phase, and a transport unit which includes first accommodation structures for the workpieces and via which the workpieces can be supplied to the first machining station during the transport phase, a second machining station is arranged in transport direction after the first machining station in spaced relationship and the first accommodation structure is arranged on the transport unit so as to be movable relative thereto for supplying workpieces to both machining stations.

8 Claims, 4 Drawing Sheets

1
1a
1a'
2
2a
2a'
3
3a
3b
3c
4
4'
4a
4b
4c
4e
4f
5
5a
5b
6a
6b
6c
6d
7
8
8a
9
10

1
1a
1'
2
2a
2'
3
3a
4'
4a
4b
4c
4d
4e
4f
6c'
6c''
7
7'
8
8'
9
10

10
4
4'
4d
4c
5
6a
7
3
4b
1'
1a
1
6b
2'
4a
3a
2a
2
3
4f
4e 10
4
4'
4d
4c
3
11
1a''
4b
7''
12
3a
2a''
4a
8'
4f
4e

ARRANGEMENT FOR MACHINING WORKPIECES

BACKGROUND OF THE INVENTION

The invention resides in an arrangement for machining workpieces including at least a first machining station in which the workpieces can be machined during a machining work cycle comprising a machining phase and a transport phase and a transport unit including a first workpiece accommodation structure to which the workpieces of the first machining station can be delivered during the transport phase by transporting them in a transport direction.

Such an arrangement has been manufactured and sold by the assignee of the present application for many years. In the known arrangement, metal cans are supplied via a transport unit in the form of a drum to a machining station, in which the rims of the cans are cut. After the rims have been cut the respective can is transferred to a receiving unit by which the cans are transferred to a further station for further machining.

Since the cutting of the rims of the cans is relatively time consuming and, during this time, no other actions can be performed by the arrangement the throughput volume of the arrangement is determined by the machining station. That is, the throughput of the arrangement is limited by the time required for the cutting of the can rims. However, since the cutting of the rims takes a relatively long time, the throughput volume of the arrangement is relatively small.

It is the object of the present invention to increase the throughput of an arrangement for machining workpieces as described above and to supply the workpieces to the machining stations in a simple and safe manner while at least two other workpieces are machined.

SUMMARY OF THE INVENTION

In accordance with the invention, an arrangement for machining workpieces including at least a first machining station in which the workpieces are machined during a machining work cycle comprising a machining phase and a transport phase and a transport unit including first workpiece accommodation structures by which the workpieces of the first machining station can be delivered during the transport phase to a transport arrangement, includes a second machining station which is arranged in transport direction after the first machining station and wherein the first workpiece accommodation structures are arranged adjustably on the transport unit.

Since at least a second machining station is arranged in transportation direction after the first machining station and generally performs the same procedure as the first machining station, the throughput of the arrangement can be increased since, in this way, at least two workpieces can be machined at the same time. Since the first accommodation structures are arranged at the transport unit in an adjustable manner, in particular pivotable in and/or toward the transport arrangement and/or slidable with respect to the transport unit, the first accommodation structures can be adjusted in a work cycle whose frequency is greater than the frequency of the machining work cycle. In this way, one or more interim cycles for adjusting the first accommodation structures can be performed for example during a can machining cycle. As a result, the supply cycle at which workpieces are supplied to the arrangement can be noticeably increased.

In order to be able—with two machining stations—to supply both machining stations with workpieces during one operating work cycle of the arrangement, the first accommodation structures are preferably so designed that they can accommodate two workpieces at the same time. If more than two machining stations are provided after one another, the first accommodation structures need to be able to accommodate a corresponding number of workpieces. As a result, a corresponding number of workpieces which are arranged in a first accommodation structure that is at least two or possibly more tools are transported by the transport omit through the arrangement during each operating work cycle of the arrangement. The throughput cycle of the arrangement is increased at a rate proportional to the number of workpieces which can be transported through the arrangement at the same time.

In other words, as a result of the operating cycle being greater in the first accommodation structure than the machining work cycle in which the transport unit is adjustable the first accommodation structure or the transport unit can be provided with workpieces at a rate or an operating cycle which is a multiple of, for example, twice that of the machining work cycle.

This is achieved in that by the adjustment in particular by the pivoting or the displacement of the first accommodation structures during the machining of the workpieces in the machining station, that is, an interim operating cycle is executed or, respectively, in the case of more than two machining stations, several interim operating cycles are executed during execution of the machining cycle. In other words, while the transport unit is at rest, in a particular embodiment of the invention, the first accommodation structure, to which workpieces are to be supplied, is pivoted or displaced for the execution of an interim operating cycle.

For an explanation of the operation, below the supply of workpieces to the transport unit at a delivery work cycle will be described in greater detail for an arrangement including two machining stations.

After the transport unit has performed a transport step a particular first accommodation structure is in a position in which it can accept a first workpiece. When the first workpiece is disposed in the first accommodation structure the first accommodation structure is moved in transport direction of the supply unit in such a way that it can accept a second workpiece. This occurs about in the middle of the machining work cycle.

When the second workpiece has been accommodated in the first accommodation structure which occurs at the end of the machining work cycle, the transport unit is advanced by a transport step so that the first accommodation structure in which the two workpieces are disposed is in a position in which the workpieces can be transferred to the two machining stations or, respectively, that they can be machined both at the same time.

With the displacement of the transport unit by a transport step the subsequent first accommodation structure again reaches the position in which it can accept a first workpiece. In this way during machining of the workpieces that subsequent first accommodation structure can be provided with workpieces in the way described above.

In the same way, the workpieces of the previous first accommodation structure whose workpieces have then already been machined in the machining stations can be removed from the machining stations. That is, after completion of a transport step of the transport unit, the previous first accommodation structure is in a position in which its workpiece can be removed. When the workpiece has been removed from the first accommodation structure—which is about in the middle of a machining work cycle the first accommodation structure is pivoted or displaced so that it is in a position in which the second workpiece can be removed. As a result, the supply cycle that is the work cycle or rate at which the arrangement provides machined workpieces is increased substantially in the same way as the supply work cycle.

For design reasons, it may be necessary to arrange the machining stations at such a distance, one after the other, that the workpieces which are disposed in the same accommodation structure cannot be machined at the same time. Therefore, in a particular embodiment of the invention, the second machining station is arranged at such a distance behind the first machining station that it corresponds to the transparent step plus the distance at which the workpieces are arranged in the accommodation structure.

In this way, in the first machining station, the workpiece supplied to the first machining station as the second workpiece which is disposed in transport direction structure behind the first workpiece of the first accommodation structure can be machined, and after the transport unit has taken a transport step, the workpiece which was supplied to the first accommodation structure as first workpiece and which is arranged in transport direction ahead of the workpiece, is supplied to the second machining station.

Should it be necessary that the second machining station is not arranged at such a distance behind the first machining station that corresponds to the transport step plus the distance at which the workpieces are disposed in the first accommodation structure, but by a differential distance more or less, this differential distance can be corrected by a corresponding position adjustment of the first accommodation structure. Therefore, in a particular embodiment of the invention, the additional distance can be changed by a correction value so that the distance which the first accommodation structure travels during a transport step is accordingly changed.

In a further particular embodiment of the invention, the transport unit includes a revolving head which is rotatable by a certain angle during each operating work cycle. In this way, workpieces can be supplied in a simple manner and by a compact device.

In addition, a precise adjustment of the accommodating structure can be achieved in a simple manner. The first accommodation structures may each be arranged on a lever arm which is connected to the revolving head so as to be pivotable about a pivot axis as this is provided in connection with a further particular embodiment of the invention. The lever arms may be connected in a simple manner to a lever drive for obtaining the pivot movement.

Advantageously, the lever arm is part of. a multi-arm lever whereby the lever drive may be a cam disc. To this end, the arm of the lever, which is arranged with respect to the pivot axis of the lever at the opposite side of the first accommodation structure, must be operatively connected to the cam disc. With the cam disc several levers and consequently several accommodation structures arranged on the respective lever arms can be adjusted. Instead of driving the lever arms by means of a cam disc they may also be operated directly by servo motors or pneumatic or respectively hydraulic drives.

In another particular embodiment of the invention, a receiving unit which includes a second accommodation structure is arranged in the transport direction behind the second machining station. The receiving unit includes second accommodation structures which are adjustable in connection with the releasing cycle of the arrangement. Preferably, the releasing cycle is a whole number multiple of the machining work cycle.

The workpieces are withdrawn from the transport unit in the manner described already earlier.

The invention will become more readily apparent from the following description of a particular embodiment thereof with reference to the accompanying drawings.

DESCRIPTION OF AN EXEMPLARY EMBODIMENT

Figure 1:
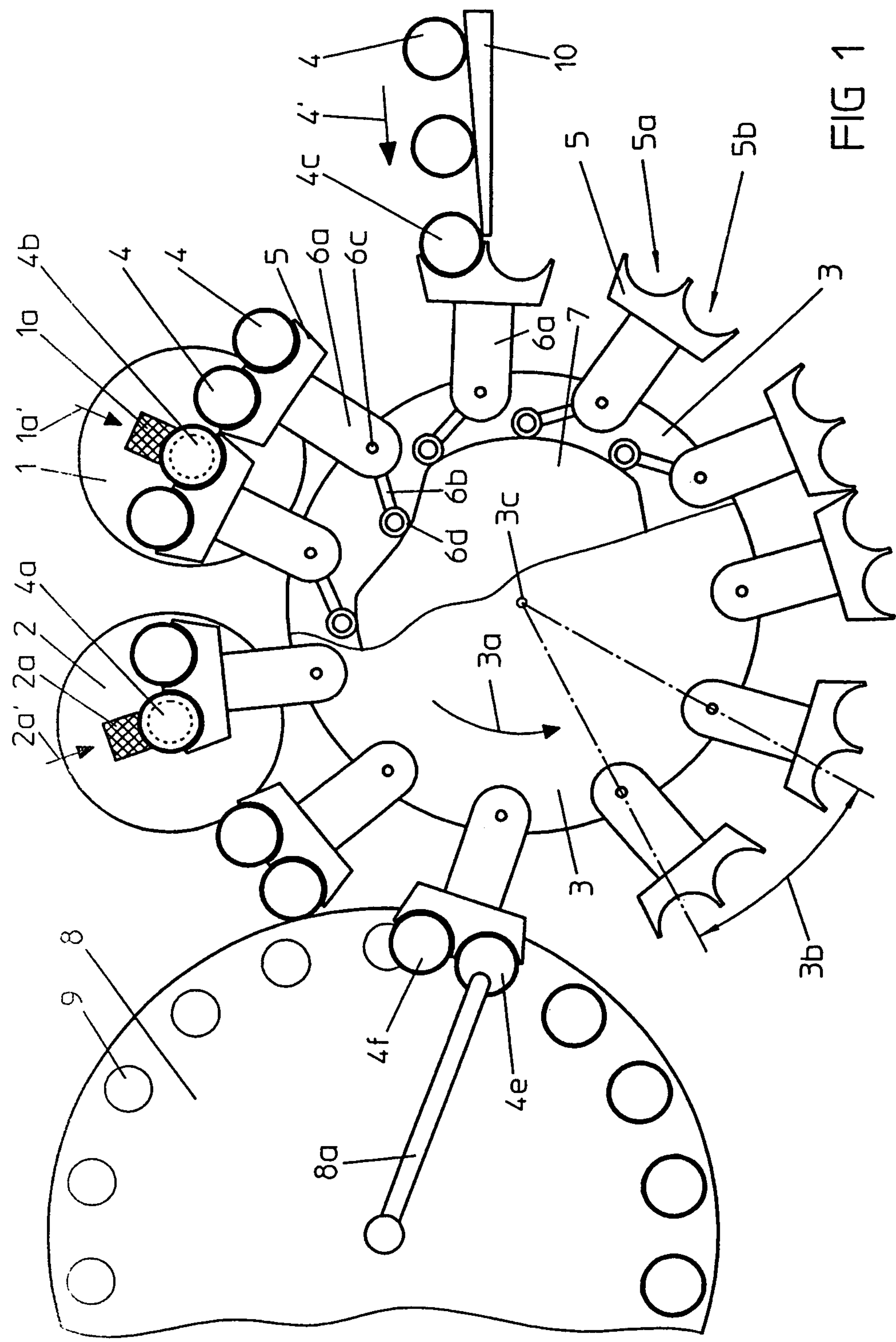
FIG. 1 is a schematic representation of an arrangement for machining a workpiece according to the invention in a first operating state.

As shown in FIG. 1, an arrangement for machining workpieces according to the invention includes a first machining station 1 for cutting the rims of cans 4 and a second machining station 2 for cutting the rims of cans 4. A can **4*b* to be machined by the first machining station 1 is disposed on an arbor 11 (FIG. 4) which in the operating state shown in FIG. 1 is arranged in the center of the cutting arrangement. The can is fixed in its position by a clamping pad 1*a* so that it can be cut at the rim by a cutting tool. In the same way, the can 4*a* to be machined by the second machining station is fixed by a second clamping pad 2*a* on an arbor 12 (FIG. 4) disposed in the center of a cutting arrangement. The movement of the clamping pads needed for fixing of the cans 4*b* and 4*a* is indicated in FIG. 1 by arrows 1*a*', 2*a*'**.

The cans 4, **4*a*, 4*b* are arranged in accommodating structures 5, which each have two shells so that they can accommodate two cans at the same time. The accommodation structures 5 are attached to a first lever arm 6*a* of a two arm lever 6*a*, 6*b* which is pivotable about a pivot axis 6*c***.

On the second lever arm **6*b* of the lever 6*a*, 6*b* which is arranged with respect to the pivot axis 6*c* opposite the accommodation structures 5, rollers 6*d* are arranged which roll along the rim of the cam disc or plate 7. The drive for the cam disc 7** is provided by a servomotor which is not shown in the figure.

In order for the rollers **6*d* to follow the rim of the cam disc 7 also in a direction toward the pivot point of the cam disc 7, a spring force is applied to the first lever arm 6*a* and/or the second lever arm 6*b*** by means of a spring which is not shown in the figures but which exerts a corresponding return force. Instead of providing the return force by a spring a three-armed lever may be used in place of the two-armed lever. Herein, the third lever follows a corresponding additional cam disc.

The levers **6*a*, 6*b* are pivotally arranged on a trimming drive which is rotatable about an axis 3*c*. The direction of rotation of the trimming drive 3 which at the same time is the transport direction of the cans 4 or, respectively, the accommodation structures 5 is indicated in FIG. 1 by an arrow 3*a***.

he rotation of the trimming drive 3 about the axis of rotation **3*c* occurs stepwise in a machining work cycle. Since eleven levers 6*a*, 6*b* are arranged on the trimming drive 3 the step width 3*b* is about 32.73 degrees. The trimming drive 3** is also driven by a servomotor which is not shown in the figure.

Cans 4 are delivered to the accommodation structures via an inclined plane 10 on which the cans 4 roll in the direction as indicated by an arrow 4'. In the operating state as shown in FIG. 1, the lever arm **6*a* is in such a position that a can 4*c* can be delivered to the accommodation structure 5 of the front shell 5***a* in the direction of rotation 3*a* of the trimming drive 3.

In the direction of rotation 3*a* of the trimming drive 3 behind the second machining station 2 an accommodation unit in the form of a drum 8 is arranged. The drum 8 has pins 9 onto which the cans 4 can be placed. The cans 4 are placed onto the pins 9 by means of a slide 8*a* by which the cans are slipped from the respective shell of the accommodation structure 5 onto pins.

In the operating state as shown in FIG. 1, the, in the direction of rotation 3*a* of the trimming drive 3, front shell 5*a* of the respective accommodation structure 5 which is disposed opposite a pin 9 of the drum 8 so that the respective can 4*a* can be slipped onto the pin 9 by the slide 8*a*.

Figure 2:
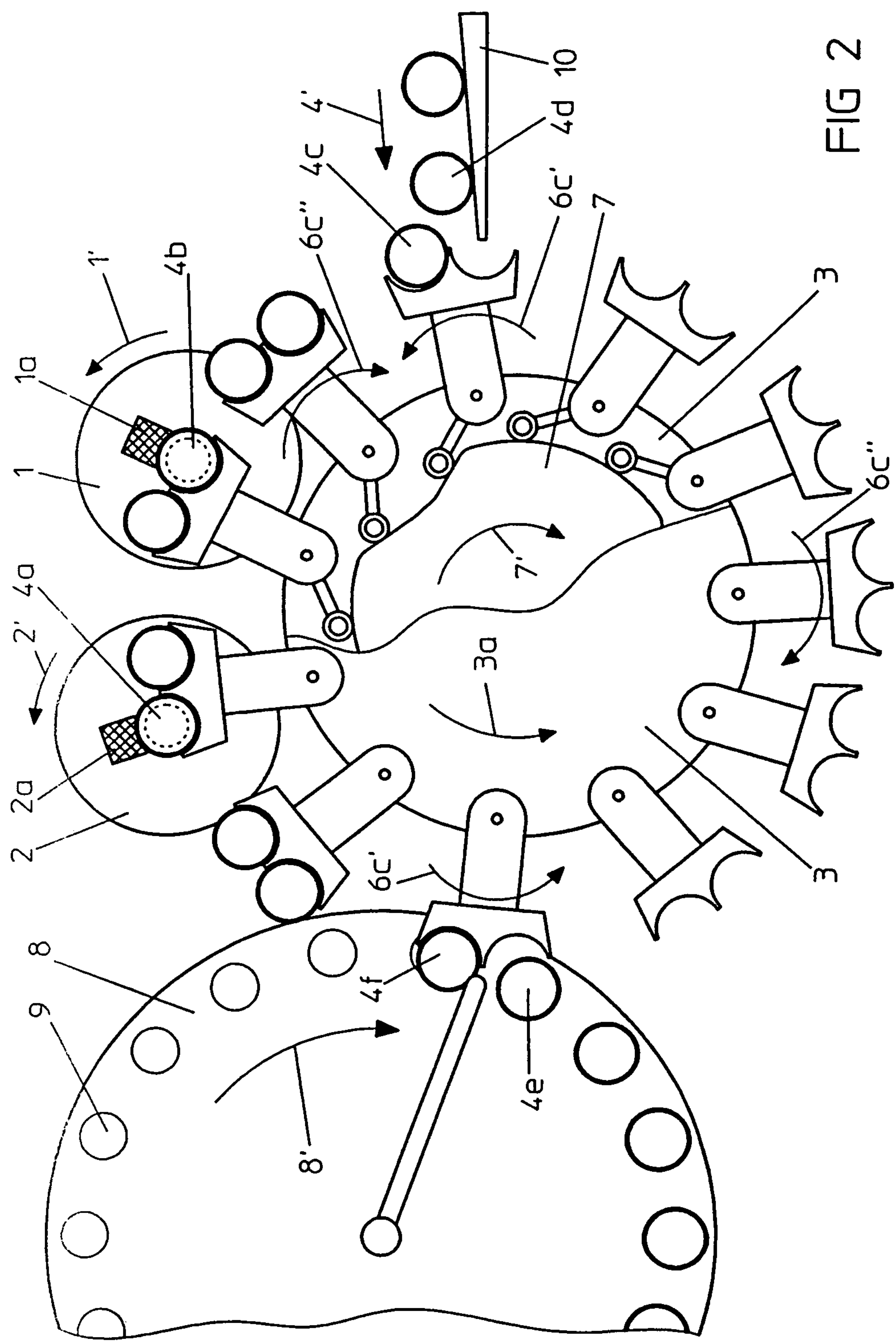
FIG. 2 is a schematic representation of the arrangement in a second operating state.

When the clamping pads 1*a*, 2*a*, have moved in thee direction as indicated by the arrows 1*a*', 2*a*', that is, when the respective cans 4*a*, 4*b* are fixed, and the cans disposed on the inclined plane 10 have all moved in the direction as indicated by the arrow 4', that is, when the front can 4*c* is accommodated in the shell 5*a* of the respective accommodation structure 5 and the slide 8*a* has slipped the respective can 4*a* onto the pin 9 of the drum 8, the operating state as shown in FIG. 2 begins.

Figure 3:
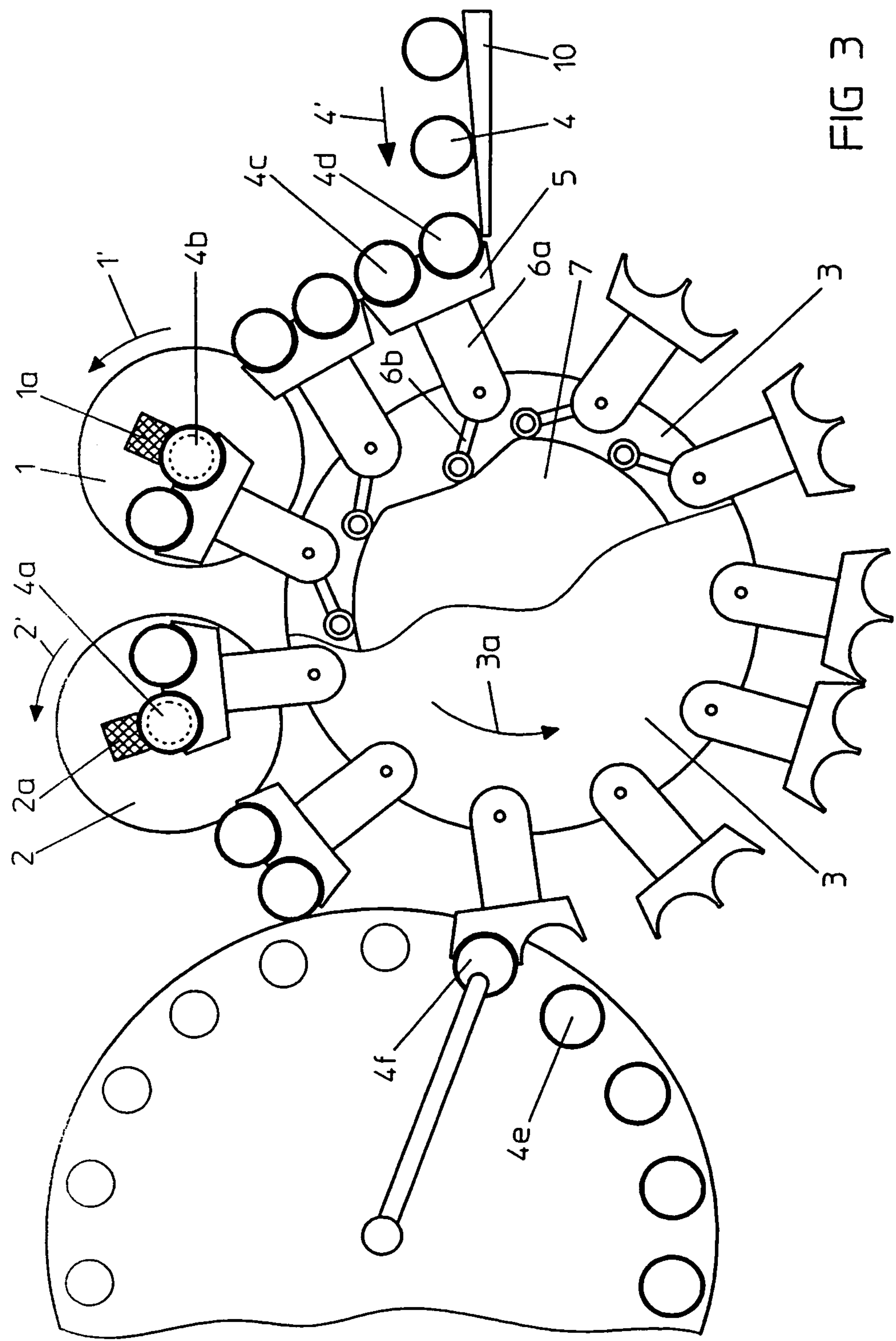
FIG. 3 is a schematic representation of the arrangement in a third operating state.

That means that the cutting apparatus of the two machining stations 112 begin to operate for cutting the rims of the cans 4*b*, 4*a* which are disposed in the cutting apparatus. This is indicated by the-arrows 1', 2'. At the same time, the cam disc 7 rotates in the direction indicated by the arrow 7'. As a result, the respective lever arms 6*a* and the associated accommodation structures 5 are pivoted in the directions indicated by the arrows 6*c*', 6*c*". The drum 8*s* is rotated at the same time in the direction indicated by the arrow 8'. After completion of these movements, the arrangement is in the operating position as shown in FIG. 3.

That is the, in the direction of rotation 3*a* of the trimming drive 3, rear shell 5*b* of the accommodation structure 5 disposed in front of the inclined plane 10 is now in a position in which it can accept a new can 4*d*. Furthermore, in the direction of rotation 3*a* of the trimming drive 3, the rear shell 5*b* of the accommodation structure 5 disposed in front of the drum 8 is now disposed in front of a pin 9 of the drum 8.

Figure 4:
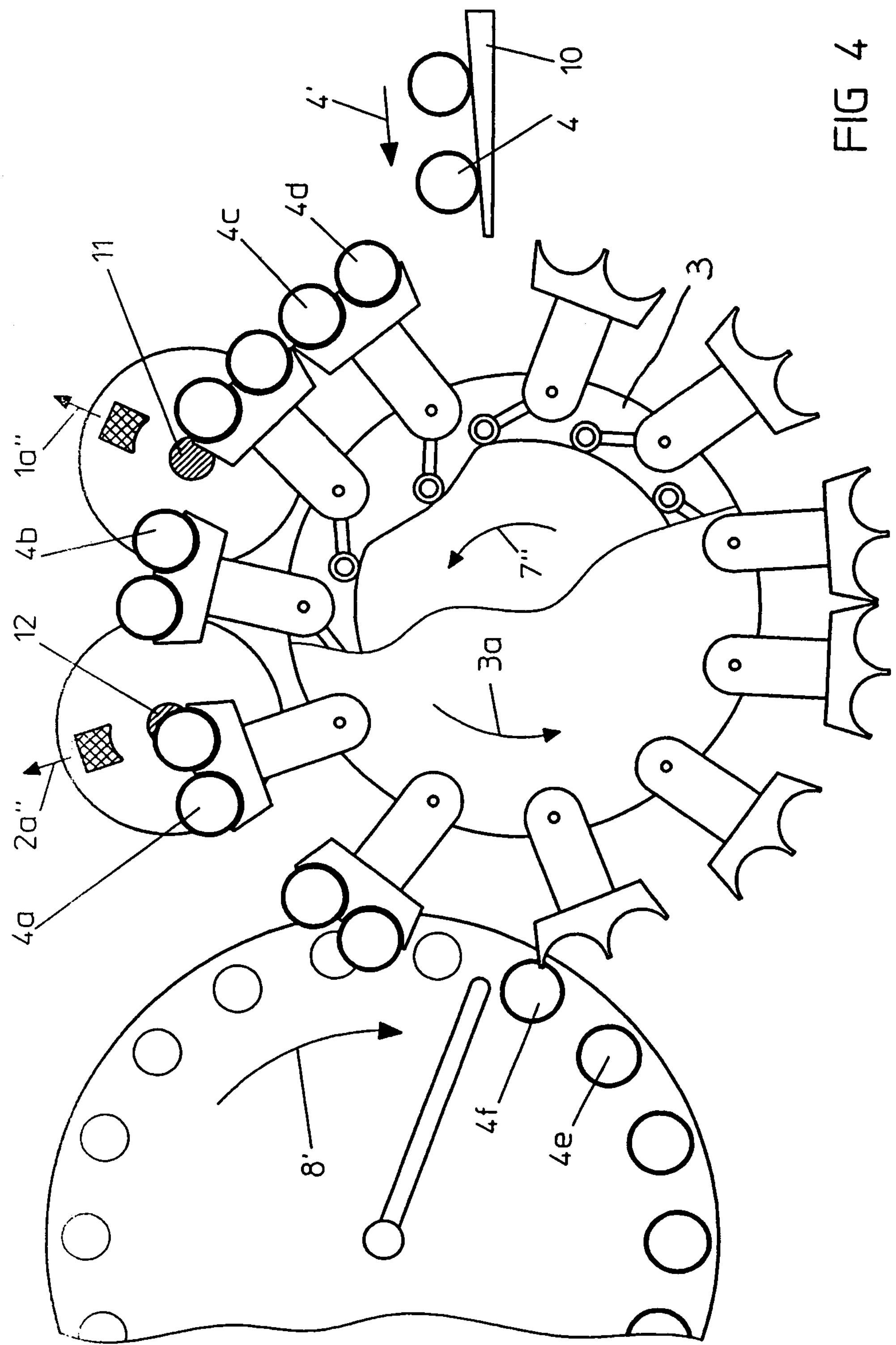
FIG. 4 is a schematic representation of the arrangement in a fourth operating state.

When the can 4*d* is disposed in the rear shell 5*b* of the accommodation structure 5 which is disposed in front of the inclined plane 10 and the can 4*f* which is disposed in front of the drum 8 has been moved by the slide 8*a* onto the respective pin 9 of the drum 8 and the rims of the cans 4*a*, 4*b* disposed in the machining stations 1, 2 have been cut, the clamping of the cans 4*a*, 4*b* by means of the clamping pads 1*a*, 2*a* is discontinued. That means the clamping pads 1*a*, 2*a* are moved in the direction as indicated by the arrows 1*a*", 2*a*", (FIG. 4). Then the trimming drive 3 is moved by one step. The movement of the trimming drive 3 is indicated in FIG. 4 by the arrow 3*a*.

Concurrently with the step-movement of the trimming drive 3, the cam disc 7 is displaced in the direction as indicated by the arrow 7". Since the trimming drive 3 and the cam disc 7 rotate at the same time, no relative movement between the two elements takes place. As a result, the respective lever arms 6*a* do not cause any pivot movement.

Further, the drum 8 is advanced by a step in the direction as indicated by the arrow 8'. Upon completion of the above movements, the arrangement is again in the operating state as shown in FIG. 1. That is, in the direction of rotation 3*a* of the trimming drive 3, the front shell 5*a* of the accommodation structure 5 which is then disposed next to the inclined plate 10, is in a position in which it can accept a can 4*c*. Furthermore, in the direction of rotation 3*a* of the trimming drive 3, the rear shell 5*b* of the respective accommodation structure 5 is in a position in which the respective can 4*b* can be slipped onto the respective arbor 11. Also, in the direction of rotation 3*a* of the trimming drive 3, the front shell of the respective accommodation structure 5 is in a position in which the respective can 4*a* can be slipped onto the arbor 12 of the second machining station 2. Furthermore, in the direction of rotation 3*a* of the trimming drive 3, the front shell 5*a* of the respective accommodation structure 5 is disposed in front of a pin 9 of the drum 8, so that it can be moved by the slide 8*a* onto the respective pin 9 of the drum 8.

Then the cans 4*a*, 4*b* arranged in the machining stations 1, 2 are fixed by means of the clamping pads 1*a*, 2*a*, and the procedure described above begins anew.

What is claimed is:

1. An arrangement for machining workpieces (4) including at least a first and a second machining station (1, 2) in each of which piece (4) can be machined concurrently during an operating cycle comprising a machining phase and a transport phase, and a transport unit (3) including a revolving head (3) with accommodation structures (5) for the workpieces (4) which accommodation structures (5) are in each case arranged on a lever arm (6*a*) which is connected to the revolving head (3) so as to be pivotable about a pivot axis (6*c*) and by which the workpieces (4) can be supplied during the transport phase, one to the first machining station (1) by moving the transportation structures (5). in a transport direction (3*a*), and a second one to the second machining station (2) arranged in the transport direction (3*a*) in spaced relationship after the first machining station (1), the accommodation structure (5) being pivotally supported on the transport unit (3) for position adjustment thereon, each accommodation structure (5) having at least a first and a-second shell (5*a*, 5*b*) for receiving at least a first and a second workpiece and, while the revolving head (3) is at a standstill, the accommodation structure, after a first workpiece has been supplied to its first shell in a first position thereof, is pivoted to a second subsequent position in which a second workpiece is supplied to the second shell while the workpieces in the at least first and the second machining stations are concurrently machined.

2. The arrangement according to claim 1, wherein means are provided for adjusting the position of the accommodation structure (5) on the transport unit (3) during the machining phase, in which the transport unit is at a stand-still, from a first position in which a first workpiece is supplied from a supply structure to the first shell of an accommodation structure to a second position in which a second workpiece is transferred to the second shell of the accommodation structure from the same supply structure.

3. The arrangement according to claim 1, wherein the distance at which the second machining station (2) is arranged after the first machining station (1) corresponds to a travel length which the accommodation structure (5) moves during a transport step plus an additional distance at which the workpieces are arranged in the accommodation structures (5).

4. The arrangement according to claim 3, wherein the additional distance, by which the travel length of the accommodation structures (5) during a transport step is increased, is adjusted by a correction value.

5. The arrangement according to claim 1, wherein the lever, arm (6*a*) is connected to a drive (7) for generating the pivot movement.

6. The arrangement according to claim 5, wherein the lever arm (6*a*) is part of a lever with at least two arms (6*a*, 6*b*) and the drive (7) includes a cam disc with which the lever arm 6*b* of the lever (6*a*, 6*b*), which is arranged, with respect to the pivot axis (6*c*) of the lever (6*a*, 6*b*), opposite the first accommodation structure (5), is operatively connected.

7. The arrangement according to claim 1, wherein in transport direction (3*a*) after the machining station (2), a receiving unit (8) is arranged which includes second accommodation structures (9) which are adjustable in a transfer cycle.

8. The arrangement according to claim 7, wherein the transfer cycle is a whole number multiple of a machining cycle.

* * * * *